FIG. 2

INVENTORS
WERNER RAMBAUSKE
HERMANN R. MESTWERDT
BY
Ruth J. Codier
ATTORNEY

Aug. 5, 1969  W. RAMBAUSKE ET AL  3,460,054
PUMPING SYSTEM FOR PULSED LASERS
Filed Aug. 24, 1967  7 Sheets-Sheet 6

FIG. 8

INVENTORS.
WERNER RAMBAUSKE
HERMANN R. MESTWERDT
BY
*Ruth Cadin*
ATTORNEY

Aug. 5, 1969    W. RAMBAUSKE ETAL    3,460,054
PUMPING SYSTEM FOR PULSED LASERS
Filed Aug. 24, 1967    7 Sheets-Sheet 7

INVENTORS.
WERNER RAMBAUSKE
HERMANN R. MESTWERDT
BY
Ruth Codieu
ATTORNEY

United States Patent Office 3,460,054
Patented Aug. 5, 1969

3,460,054
PUMPING SYSTEM FOR PULSED LASERS
Werner Rambauske and Hermann R. Mestwerdt, Dayton, Ohio, assignors to the United States of America as represented by the Secretary of the Air Force
Filed Aug. 24, 1967, Ser. No. 663,477
Int. Cl. H01s 3/09
U.S. Cl. 331—94.5     4 Claims

ABSTRACT OF THE DISCLOSURE

A cylindrical highly evacuated hollow tube having spherically formed ends and a toroidal cross section provides an elongated space at its axis for a laser crystal. The system has a toroidal anode plate at the midpoint and a cathode at each interior end to produce two electron streams that excite fluorescent material on opposite sides of the anode plate to produce light radiation received by the laser. A sphere, having a reflective inner surface, surrounds the whole system, intercepts light and reflects it back to the laser. A second embodiment replaces the torodial cathode system with several, separated, light-producing tubes arranged around the laser rod.

---

The invention is concerned with an optical pumping system for pulsed lasers which has a very high efficiency between electrical power input and pumping light output, likewise a very high efficiency between pumping light output and input of light into the laser rod. These efficiencies result in the ability to use small power supply units, provide low heat generation, and allow for the possibility of high reptition rates for laser pulsing, when compared with conventional laser pumping systems.

According to the invention, utilizing the phenemenon of field emission established between spaced metallic electrodes within a high vacuum enclosure, a high density electron stream can be created between the electrodes (an anode and a cathode) when pulsed by a high voltage source of short duration. Further, if the anode electrode is coated with special fluorescent materials, the dense electron stream upon striking the materials will cause light emission. The anode upon which the material is deposited is cooled by a fluid arranged to flow through suitable internal ducts and piping brought outside the vacuum envelope.

The anode is a plane annular surface and is arranged perpendicular to and symmetrically located with respect to the laser rod. The system is, according to the invention, enclosed in a photometric sphere, which collects all diffusely emitted light rays from the fluorescent material and which reflects these rays either by one or several reflections toward the laser rod, i.e. the radiation density at any point within the sphere is the same. The fluorescent material of the anode is composed of layers of different sensitivity in respect to different electron velocities and likewise of different wavelengths of exciting electromagnetic radiation.

Among the many and varied possible applications of this system are: low light level aerial photo reconnaissance, Schlieren and interference photography, and optical radar. For instance, in aerial night photography, despite the application of light amplifiers, intolerably long exposure times are needed because of the photonflux limitations due to the very low natural illumination. Also, it is desired to use only a limited spectral band to eliminate the degrading effect of haze and light scattering; however, the available energy is considerably reduced. For these reasons, additional illumination of very short duration with rapid repetition freqency using small bandwidth radiation is required. High powered, pulsed lasers necessitate excessive weight of electrical equipment which is impractical for airborne systems. Also, a single, high power laser can only illuminate a relatively small area of the terrain during each flash. Therefore, to cover a reasonable area, optical scanning and/or rapid firing of the laser with electrical power requirements as small as possible are desired.

For example, in low altitude night photo reconnaissance, a practical laser can illuminate an area on the ground corresponding to an acceptance angle of 20°. At least 100° lateral coverage is desired which makes rapid firing and scanning of the laser beam necessary. Conventional, powerful, pulsed lasers cannot be fired at the desired rate due to power and space limitations in airborne arrangements.

The invention proposes a novel, very efficient, optical pumping system with high repetition rate for pulsed lasers. For the pumping of the solid state laser, Xenon flash tubes are explosives, exploding wires, pinched plasmas, ionically excited phosphors or injection diodes are in use or have been proposed. The radiation of all these devices, except the phosphor and the injection diode, has a broad special spectral distribution whereby the laser uses for excitation only a small portion of the spectral band distribution. Therefore, a condiserable amount of energy is wasted and converted into undesirable heat.

In the cases of phosphor and injection diodes, which are narrow spectral band radiators, no radiated spectral energy is wasted; however, due to their arrangement and the methods of their excitation, a large part of their emitted energy is wasted due to insufficient optical coupling.

Also, on the other hand, in all cases undesirable heat is produced by the inefficiency of the conversion process from electrical or chemical energy into light energy. These two different kinds of conversion processes cause undesirable heat generation and require elaborate cooling systems which are difficult to apply and have a low efficiency.

The invention proposes to overcome the difficulties of rapid sequency firing and of achieving a reasonable ratio between electrical input and optical output, an proposes a very efficient electrical and optical coupling system as explained below.

The basic idea is to utilize the luminescent effect of a fluorescent or phosphorescent material excited by a high density electron stream or plasma emanating from a field emission cathode. This stream is produced by a high voltage, short duration condenser discharge. The fluorescent material is deposited on an annular metallic plane which constitutes the anode of the system. The laser rod is perpendicular thereto and centrally arranged to this anular plane. The entire arrangement is enclosed in a photometric sphere, the inside of which is made highly reflective and directs all emitted rays into the laser rod, either directly or after a number of reflections.

Also, according to the invention, a very efficient cooling system for the phosphor, deposited on the metallic annular plane, can be applied. Further, according to the invention, a fluorescent material which emits only the proper exciting wavelength for the laser is selected.

The generation of the desired intense electron stream has been demonstrated in X-ray flash equipment, where in a high vacuum an almost pure electron plasma of very high density (for instance corresponding to 1000 amperes) by application of a high voltage (100 kilovolts), has been produced for short duration flashes (for instance 1 microsecond). This was achieved by using a field emission cathode where an extremely high electron emittancy can be produced under room temperature conditions, if the field gradient on the cathode is very high (for instance $10^6$ volts/cm.).

According to the invention, such field emission process, however, with lower electron densities (for instance 100 amperes), is utilized to excite fluorescent material deposited on the anode. Since, according to the invention, the anode is in a parallel plane in respect to the cathode, the entire anode area will be excited to light emission by the impinging electron stream. A very efficient conversion from electrical energy into light energy is achieved by the following processes: (a) the electron stream will excite the fluorescent material on the front side by cathode luminescence; and (b) part of the electron stream will penetrate the fluorescent material and generate X-rays in the metallic anode. These X-rays will also then excite the fluorescent material from the rear side by photoluminescence.

According to the invention, different luminescent materials are deposited on the anode in several layers. The layer material adjacent to the anode is selected so that the X-rays are converted into UV-radiation. The next layer is made in such a way that this radiation and the remaining X-rays are converted into, for example, blue radiation, while the third layer or outer layer, converts both radiations into (for example) green pumping radiation to match the light pumping needs of the laser.

Due to the velocity distribution of the impinging electron stream, which can be controlled by the phase shift between voltage and current in the flash circuit, low velocity electrons will be converted to green radiation because of absorption, while higher velocity electrons penetrate different layers and produce corresponding radiation. Hence, a large portion of the energy of the electron stream is converted to green radiation.

Naturally, other portions of the electron stream energy are converted to heat which can be dissipated by a simple cooling system attached to the anode.

The last portion of the electron stream upon striking the anode generates some non-absorbed X-rays which makes necessary a certain amount of shielding.

The cathode used in this arrangement is the commercially available field emission cathode, whose performance can be increased considerably by attaching small needles with sharp points on the surface of the cathode itself. In addition, for instance, an auxiliary annular electrode surrounds the cathode, and thereby field emission is initiated by the high voltage. If needles are attached to the cathode, the field emission is preserved during the pulse time.

Further, according to the invention, a unique optical system for the efficient coupling of the light radiation to the laser rod is proposed. The anode covered by the fluorescent material is of annular shape and arranged perpendicular to the laser rod. All radiation emanating from this annular anode surface is guided to the laser rod by the inner surface of a highly reflecting photometric sphere surrounding the whole arrangement. The reflective inner surface of the sphere might be mirror-like or diffuse. In every case, the reflection coefficient has to be matched to the wavelengths of the generated pumping light. In such an arrangement all emitted rays hit the laser either directly or after one or several reflections from the inner surface of the sphere.

According to the invention and due to the fact that the anode is opaque and radiates only into a half sphere, a double arrangement containing two anodes and two half spheres is proposed.

With proper design of the high voltage supply circuit very high repetition frequencies of about 500 per second have already been demonstrated.

These and other advantages, features and objects of the invention will become more apparent from the following description taken in connection with the illustrative embodiments in the accompanying drawings, wherein:

FIGURE 3A is a fragmentary view of the cathode plate and cathode support;

Referring more in detail to the drawing, an elongated highly evacuated tube 10 is toroidal or doughnut-shaped in cross section. The two concentric walls 11 and 13 of the tube 10 form a bore 12 and a hollow evacuated annular portion 19 which may or need not be gas filled, as expedience dictates. The laser crystal 14, generally an elongated and artificially grown ruby, is located at the central axis of the cavity 12, and is therefore exterior to the vacuum within the tube 10. It is supported by expedient means such as 5, FIGURES 1 and 2. It is easily accessible for circulation of a cooling agent, for example, air. The periphery of the laser 14 is exposed to receive and store the light energy pumped into it and provides a high intensity coherent light beam L. The beam L can emanate in short bursts lasting a few milliseconds or being repeated in milliseconds, can be continuous for all practical purposes. A silvered reflecting mirror 15 is located on one end of the laser 14. The other end is provided with a partial reflector 17 through which the laser burst discharges in a coherent single wave length beam L.

Figure 5:
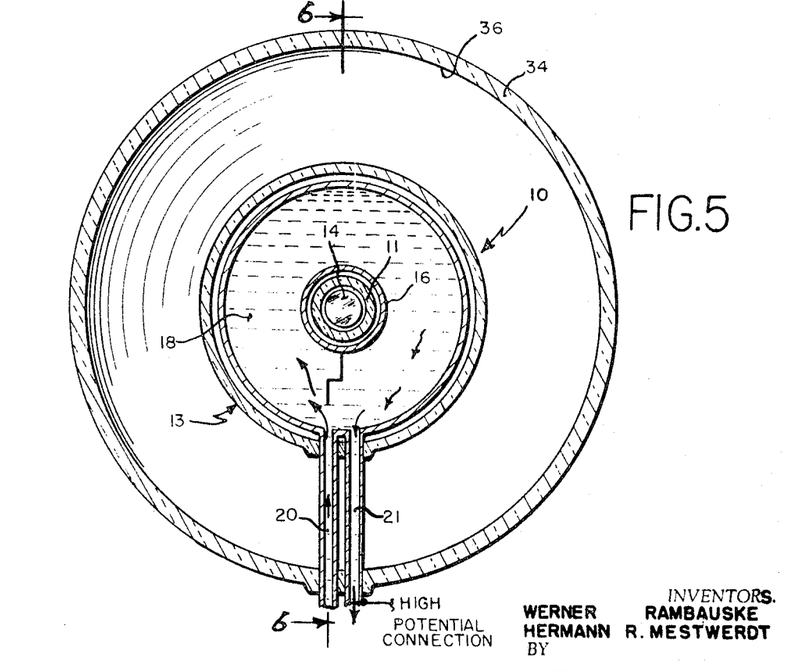
FIGURE 5 is a cross section taken on the line 5—5 of FIG. 1.
Figure 6:
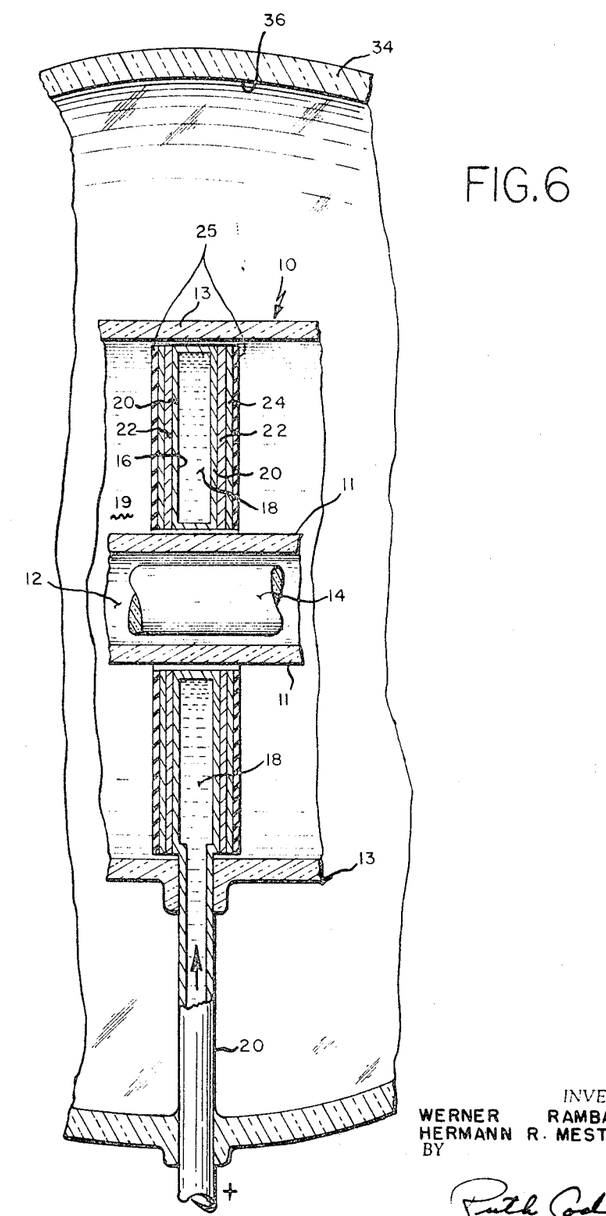
FIGURE 6 is a longitudinal enlarged fragmentary section taken on the line 6—6 of FIGURE 5.

A ring-shaped, flattened, hollow anode 16 is located at the median point in the length of the tube 10, and lies perpendicular to the central axis of the device and perpendicular also to the laser 14. It is constructed preferably of metal, such as tungsten, tantalum or copper of a non-porous type. The hollow interior space 18 of the anode 16 communicates with inlet 20 and outlet 21 (FIGURES 2 and 5) for the introduction of a suitable cooling fluid such as water. Tubing 20 and 21 connect to a water or other cooling fluid supply (not shown), and actually, at their juncture, form the anode 16. On both sides of the anode ring 16 are deposited several layers of fluorescent and luminescent material 22. (See FIGURES 1 and 6). The selection and purpose of the material forming these layers has been described above. Materials used successfully are calcium tungstate, thiazene, or any phosphor that gives off blue light as the inner covering layer 22. For the outer layer 24, zinc sulfide or barium or platinum cyanide or any phosphor emitting a green light can be used. The whole anode system may then be covered by a thin protecting laper 25 of material such as quartz. This is useful for protection against blast effect (see FIGURE 6).

Figures 1, 3:
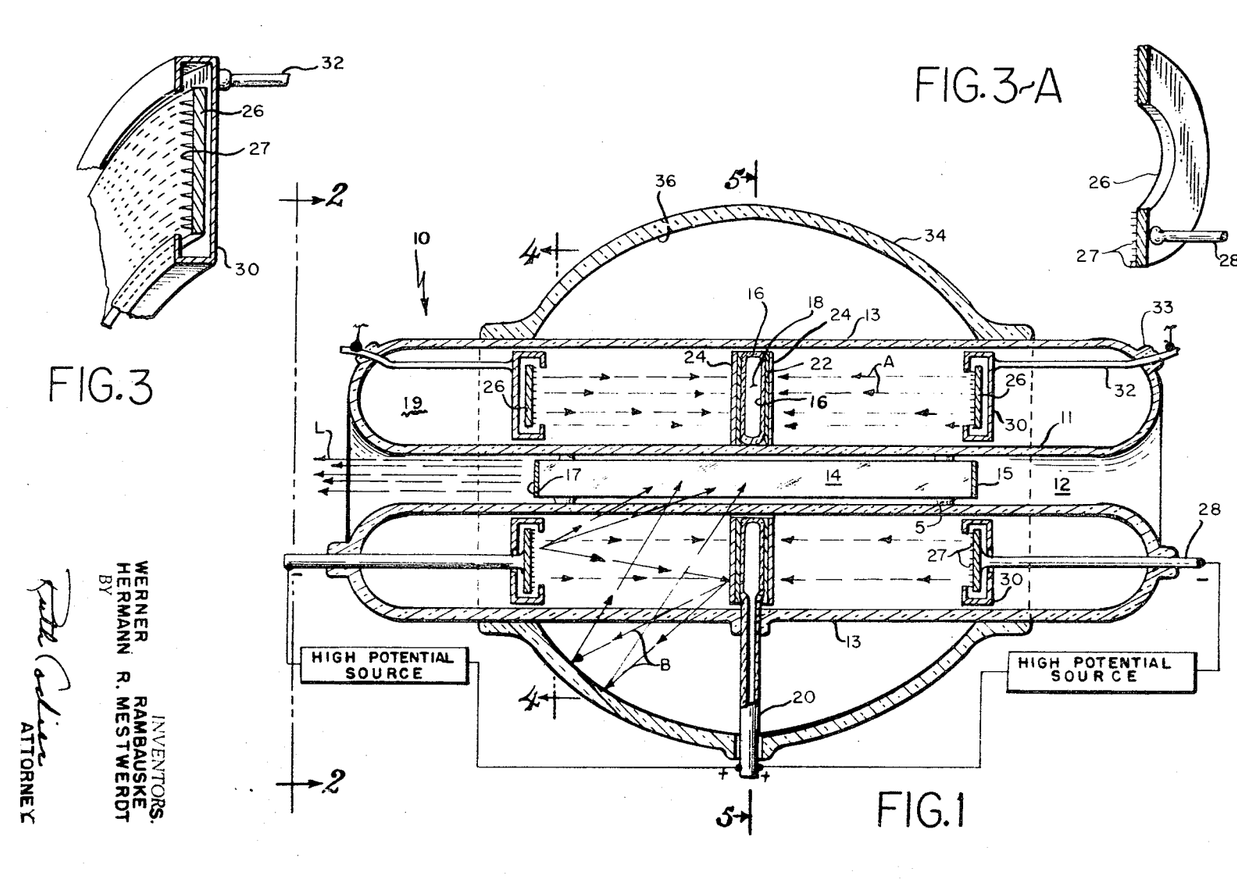
FIGURE 1 is a longitudinal central section of one form of the device taken on the line 1—1 of FIGURE 2.
FIGURE 3 is a fragmentary detail view of a cathode and cathode shell partly in cross section and partly in perspective, and showing the needle points on the surface of the cathode.
Figure 2:
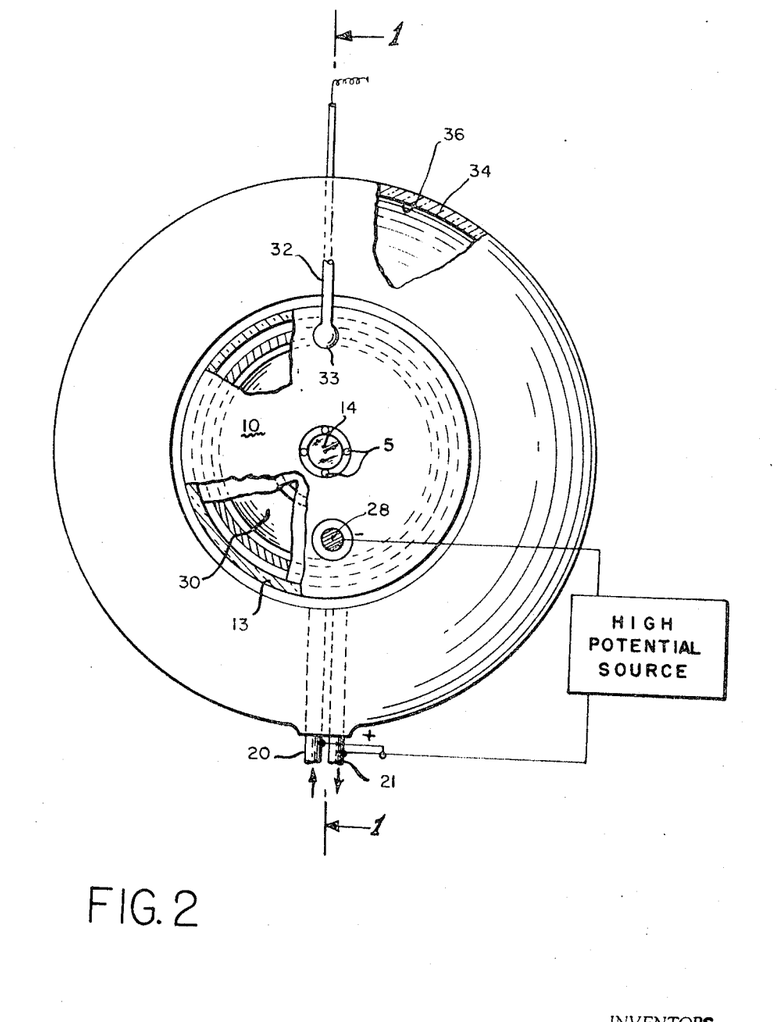
FIGURE 2 is an end elevation, looking in the direction of the arrow 2—2 of FIGURE 1 with portions broken away to show the rear side of the cathode, and the rear side of the cathode shell.
Figure 4:
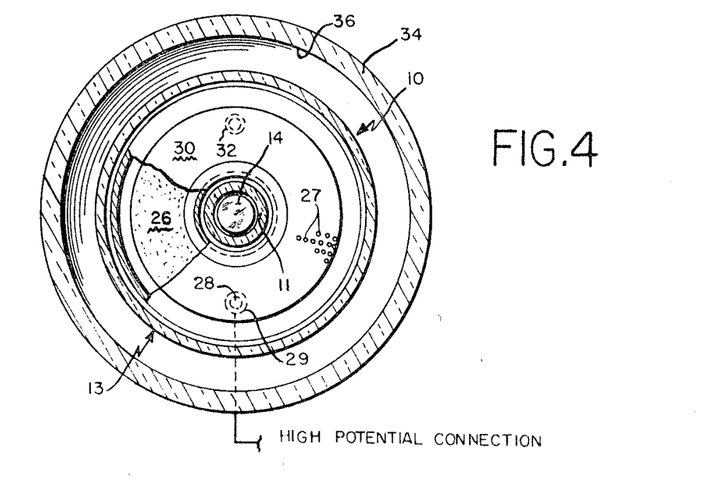
FIGURE 4 is a cross section taken on the line 4—4 of FIG. 1.

The device is symmetrical. The anode 16 is located at the median and a cathode 26 located adjacent each end of the device. Each cathode 26 is also toroidal in shape, is made of silver-coated molybdenum or other equally suitable material to provide a highly reflecting surface.

Needle-shaped field emission points or regularly grooved pyramids, see 27, FIGURE 3, will keep the optical reflection high. Each cathode plate 26 is supported by a support rod 28 connected to a high potential source (not shown). Each cathode is also surrounded by a cylindrical annular auxiliary cathode shell 30 of copper or molybdenum or other suitable metal which functions as a trigger electrode or tickler. Auxiliary cathode 30 is supported by the support and conductor 32 admitted into the tube 10 at 33 as by molding. The cathode shells 30 are so arranged that they are separated from the cathode plates 26 by a narrow distance. Due to the generated high field strength, the beginning of the discharge is initiated in the shell 30.

The high potential may be obtained by electrical condenser means which is quickly recharged (in milliseconds). When the trigger or tickler electrode 30 is pulsed by a high voltage source of short duration a very intense electron stream is generated between the cathode 26 and anode 16. The slower electrons in the stream energize the outer zinc sulfide coating to produce a green light for energizing the laser. The high speed electrons pass through the phosphor and strike the anode 16 to thereby produce X-rays in the normal manner. The X-rays in turn energize the calcium tungstate phosphor which then gives off a blue light. The blue light then energizes the zinc sulfide phosphor to provide a very intense green light by the combined effect of the energization of the outer zinc sulfide by the slow electrons directly and by the high speed electrons through the generation of X-raps and blue light to indirectly further energize the zinc sulfide.

An additional layer which produces ultraviolet light may be located between the anode and the calcium tungstate. These intense light rays are pumped into the laser crystal 14 both directly and by reflections and re-reflections from the interior reflective surface 36 of the globe 34.

Diffuse optical green radiation in all directions from the fluorescent material 24 is reflected by the interior walls of a reflecting or globular reflector sphere 34 and by the reflecting surfaces of the cathodes 26 toward the laser rod 14, which, after stimulation, emits coherent radiation into a narrow (red) beam. The globe 34 may be of glass or quartz or similar suitable material, and need not necessarily be evacuated. It is to be noted that all of the elements of the system, except the laser crystal 14 and the globular reflector 34 are located within the evacuated tube 10 and extend annularly around the laser. The direction of the energy emission from the cathodes is indicated by the arrows A in the upper half of FIGURE 1, while their reflection as light rays are indicated in the lower half of FIGURE 1.

Figure 7:
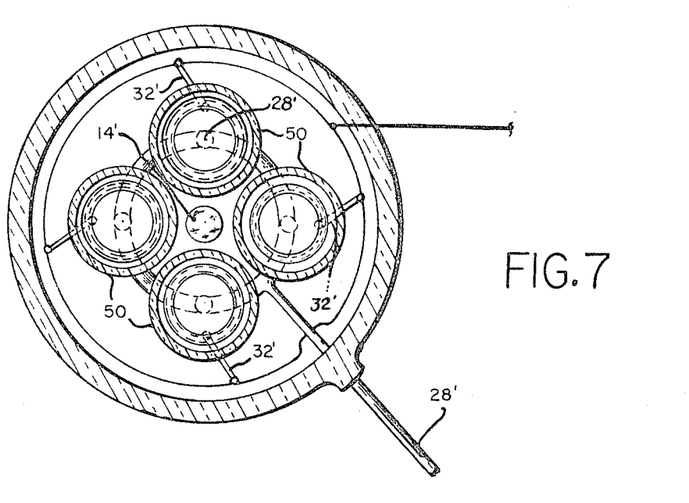
FIGURE 7 is a modified form of the device, analogous to section 4—4 of FIGURE 1, wherein four parallel tubes are arranged around a laser rod.
Figure 8:
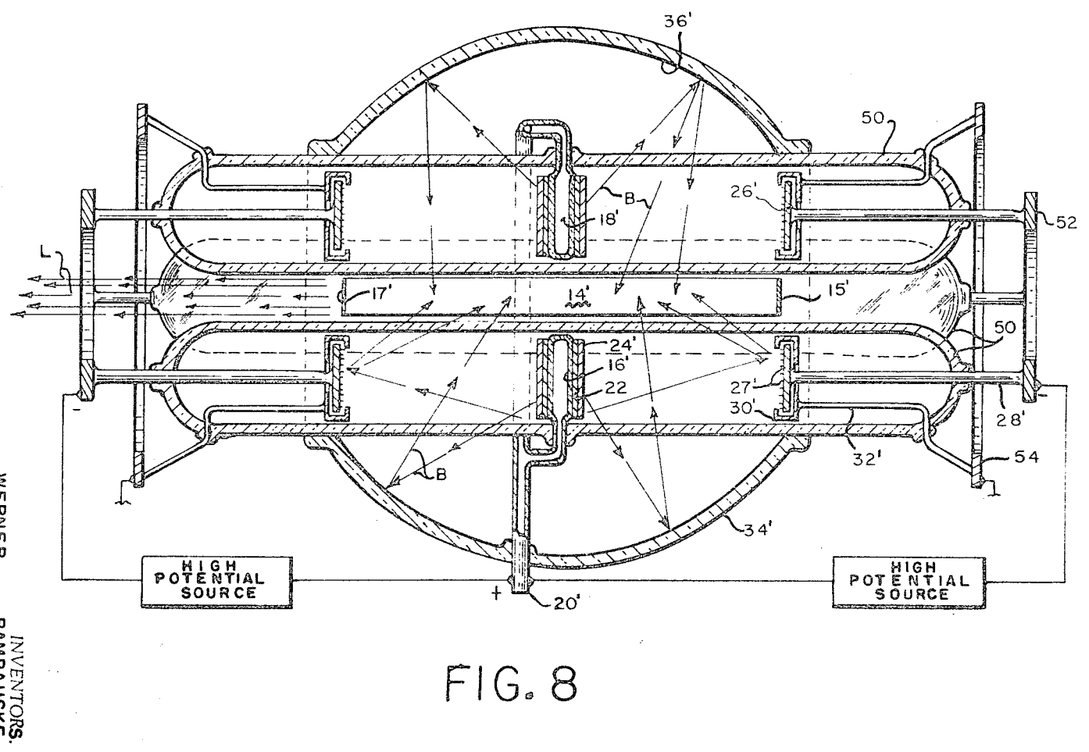
FIGURE 8 is a longitudinal sectional view of the modified form of FIGURE 7.
Figures 9, 10, 11:
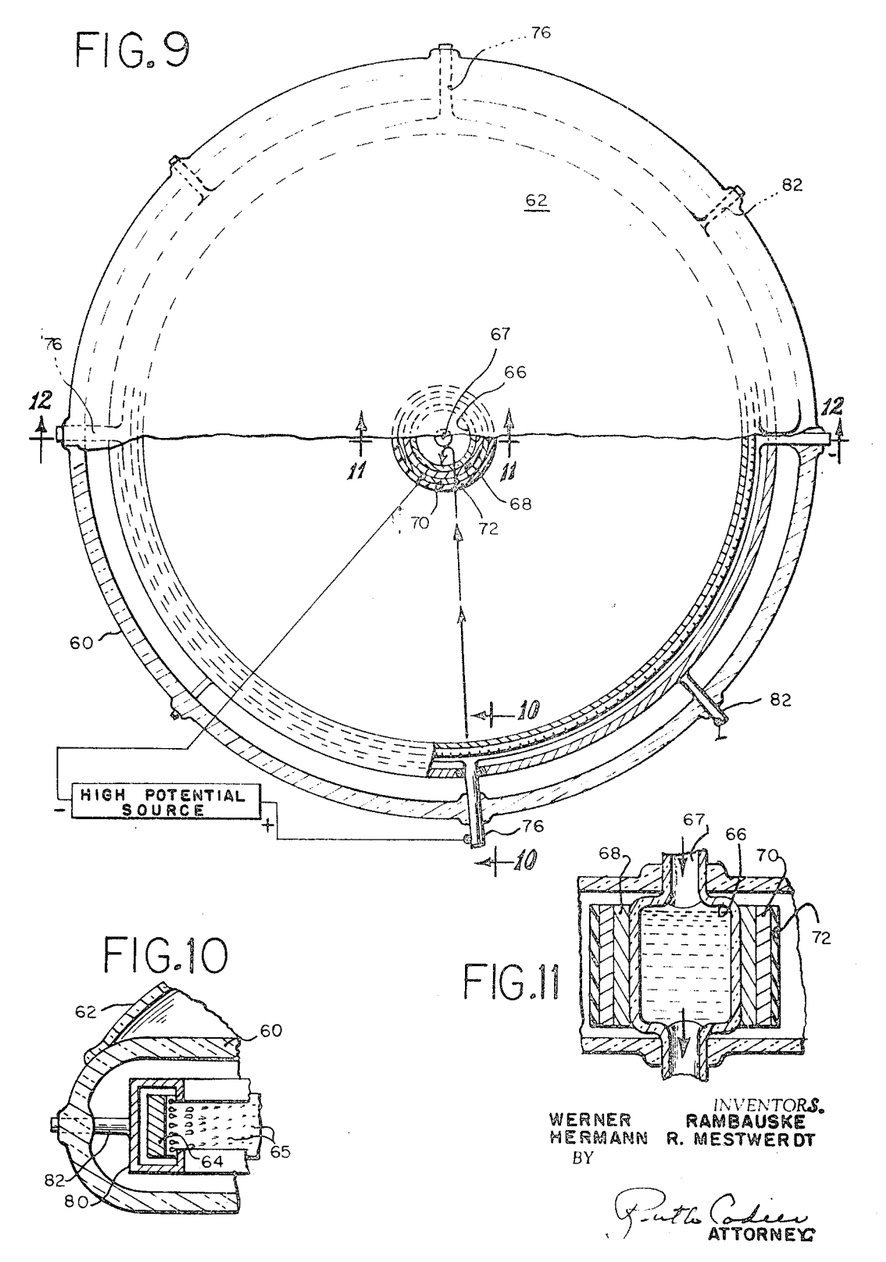
FIGURE 9 is a cross section of a further modification.
FIGURE 10 is a detail view in fragmentary cross section of the cathode of the modification of FIGURE 9, and taken on the line 10—10 of FIGURE 9.
FIGURE 11 is a fragmentary detail view in cross section taken on the line 11—11 of FIGURE 9.
Figure 12:
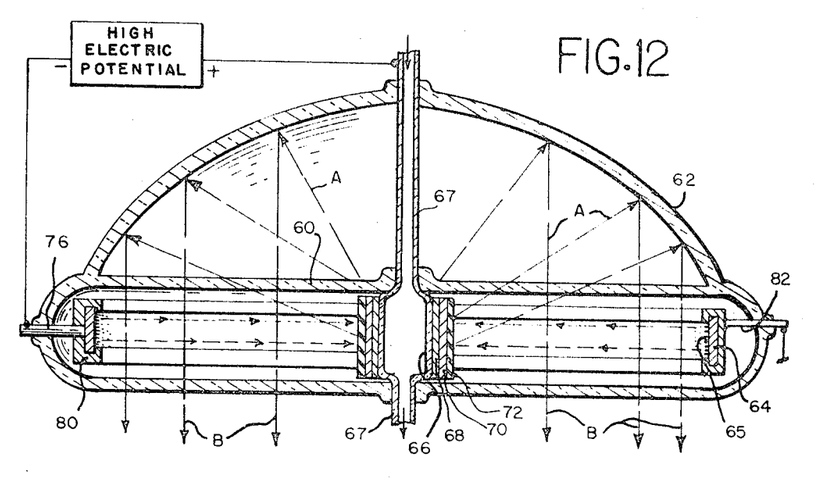
FIGURE 12 is a vertical cross sectional view taken on the line 12—12 of FIGURE 9.

FIGURES 7 and 8 are a modified form of the device involving the same principles. Four or more parallel and separate evacuated tubes 50 are employed instead of the single doughnut-shaped tube 10 of FIGURES 1–6. The tubes 50 are arranged about the laser crystal 14'. Each tube 50 is provided with a cooled anode system analogous to that used for the primary anode 18. (FIGS. 1–6). Each tube 50 has a copper hollow anode 16'. A common cooling system 20' serves the anodes of all the tubes 50. Each anode 16' is provided with phosphorescent layers 22' and 24' with functions analagous to those described above. The additional quartz covering analagous to the coating 25 and not shown in FIGURES 7 and 8 may also be used. Each tube 50 has a cathode 26' located adjacent its ends and parallel to the anode 16'. Each cathode may be provided with needle points 27', and a support and conducting rod 28', auxiliary shell cathodes 30' and support and conducting rods 32'. A pair of buss bars 52, located at the opposite ends of the tubes 50 provide a common conductor; and each supporting rod 32' leads to a common tickler bus ring 54. The lazer crystal 14' has silvered and half silvered ends 15' and 17'. Each of the elements of this modification, including the globe 34' function as above described in connection with the primary modification. The high energy emitted from the cathodes 26' is reflected and re-reflected to reach the laser crystal, 14' (see arrows B; FIGURE 8).

Referring now to the modification shown in FIGURES 9–12: The device of this modification is primarily a high intensity light source, and dispenses with the laser crystal. An evacuated tube or quartz envelope 60 is a flattened element, a circle in plain view. A partial spherical reflector 62 is molded or otherwise secured to the upper surface of tube 60. (see FIGURES 10 and 12). The cathode system comprises a circular cylindrical cathode element 64 having points 65 discharging energy to a centrally located anode member 66, lying in the same horizontal plane. The hollow copper anode 66 is part of a cooling duct system 67 and has the coating elements referred to above, such as calcium tungstate or equal 68, zinc sulfide 70, and quartz covering 72. The element 67 operates also as a support and conductor for the anode and connects to a high potential source which conects also to the cathode support and conductor 76.

A tickler or supplementary cathode shell 80 is circular and partially encloses the primary cathode 64. It is supported by the support and conductor 82. The direction of reflection of the rays are indicated by the arrows A and B in FIGURE 12, the rays emanating in the colimated beam B.

In a further embodiment, the spherical reflector 62 is molded onto the tube 60 and made an integral part of it. In this form, the upper side of the tube 60 is eliminated and the whole interior, including the area inside the reflecting dome 62, is evacuated.

Although the invention has been described with reference to particular embodiments, it will be understood to those skilled in the art that the invention is capable of a variety of alternative embodiments within the spirit and scope of the appended claims.

We claim:

1. A symmetrical pumping system for pulsed lasers with high repetition frequency, said system comprising an elongated highly evacuated tube toroidal in cross-section and forming an elongated space at its axis; a laser crystal located in said space; a toroidally formed anode located midway the ends of said tube and positioned perpendicularly to said laser crystal; a cathode located adjacent each end of said tube and in parallel position with respect to said anode so that said anode receives an impinging electron stream emanating from each cathode from two directions and on each of its oppositely directed surfaces; a hollow spherical element positioned to surround the median portion of said tube; and a highly reflective surface on the interior of said spherical element whereby rays striking the interior surface of said spherical element will be reflected to said laser crystal, and a plurality of needle points on the surface of each of said cathodes for redirecting to said laser rays reflected from said anode.

2. A high intensity light source comprising a highly evacuated flat tube forming a solid circle in plan view, a hollow partial spherical element secured to the upper wall of said tube, a highly reflective surface on the interior of said spherical element, a circular cathode system located adjacent the periphery and inside of said evacuated tube, a fluid cooled anode located at the center of said evacuated tube and lying in the same horizontal plane as said cathode for receiving energy from said cathode from all directions in the plane of said cathode system, said cathode system comprises a primary circular cylindrical cathode member, needle points on the interior surface of said cathode, an auxiliary cathode shell partially surrounding said primary cathode, a supporting and conducting element for each of said primary and auxiliary cathodes.

3. An optical pumping system operating in a vacuum, comprising a metallic cathode and a metallic anode, for creating a high density electron stream, a coating of a fluorescent material on said anode for causing light emission from the rays emanating from said cathode and striking said anode needle points, a spherically formed element partially surrounding said system, a reflecting surface on the interior of said element for reflecting and collimating the rays emanating from said system.

4. A symmetrical pumping system for pulsed lasers comprising a plurality of elongated highly evacuated tubes symmetrically arranged about and parallel to an elongated laser crystal, an anode located in each of said tubes and in the mid section area of each, a pair of cathodes in each of said tubes, one of each pair located adjacent the end areas of each of said tubes and in parallel positions with respect to said anodes so that each of said anodes receives an impinging electron stream emanating from said cathodes from two directions and on the oppositely directed surfaces of said anodes, a hollow spherical element positioned to surround the median portions of all of said tubes and a highly reflective surface on the interior of said spherical element for reflecting rays striking the interior surface of said sphere to said laser.

References Cited
UNITED STATES PATENTS

| | | | |
|---|---|---|---|
| 3,309,620 | 3/1967 | De Ment | 331—94.5 |
| 3,314,021 | 4/1967 | Haun et al. | 331—94.5 |
| 3,349,339 | 10/1967 | Thorneton | 331—94.5 |

RODNEY D. BENNETT, JR., Primary Examiner

C. E. WANDS, Assistant Examiner